United States Patent [19]
Ames

[11] Patent Number: 5,157,745
[45] Date of Patent: Oct. 20, 1992

[54] MULTI-CHANNEL FIBER OPTIC ROTARY JOINT FOR SINGLE-MODE FIBER

[75] Inventor: Gregory H. Ames, Gales Ferry, Conn.

[73] Assignee: The United States of America as represented by the Secretary of the Navy, Washington, D.C.

[21] Appl. No.: 760,635

[22] Filed: Sep. 16, 1991

[51] Int. Cl.$^5$ ............................................. G02B 6/26
[52] U.S. Cl. ........................................ 385/26; 385/25; 385/36
[58] Field of Search ............................... 385/25, 26, 36

[56] References Cited

U.S. PATENT DOCUMENTS

| | | | |
|---|---|---|---|
| 4,725,116 | 2/1988 | Spencer et al. | 385/26 |
| 4,872,737 | 10/1989 | Fukahori et al. | 385/36 X |
| 5,073,040 | 12/1991 | Guinard | 385/36 X |

FOREIGN PATENT DOCUMENTS 0031807  2/1991  Japan ..................................... 385/36

Primary Examiner—John D. Lee
Assistant Examiner—S. W. Barns
Attorney, Agent, or Firm—Michael J. McGowan; Prithvi C. Lall; Michael F. Oglo

[57] ABSTRACT

A fiber optic rotary joint device is described which includes a rotor connected to either an input or output fiber optic array and a stator connected to the other of the input or output fiber optic array. A prism is mounted within the rotor for derotating an image of the input array to allow coupling to the output array. A prism rotor and a gear system are provided for rotating the prism at half the speed of the rotor. Optical means are provided for two adjustment tiers (small angular adjustment and fine adjustment) of alignment of the light propagation path for each channel of the array. Mechanical structural features provide maintanance of accurate alignment of optical elements under rotation of the joint. Further mechanical structural features provide resiliency of the gear system to isolate its operation from maintenance of mechanical alignment of optical elements.

13 Claims, 3 Drawing Sheets

MULTI-CHANNEL FIBER OPTIC ROTARY JOINT FOR SINGLE-MODE FIBER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a multi-channel fiber optic rotary joint device for passing signals on multiple, single-mode or multi-mode optical fiber channels across a continuous rotary interface with low loss, low crosstalk between channels. Light may travel in either direction through the rotary joint device and the interface may be rotated continuously in either direction. The rotary joint device of the present invention has utility in systems having a rotary component such as in fiber links to rotating antennas and winches for a towed buoy.

(2) Description of the Prior Art

Multiple channel rotary joints for optical fibers have been developed and are known in the prior art. U.S. Pat. No. 4,725,116 to Spencer et al. illustrates one such rotary joint which can simultaneously transmit optical signals along two or more channels in either of two directions. The rotary joint has a rotor and a stator to each of which is connected a plurality of optical fibers. Within the joint, reflecting mirrors are used to redirect off-axis optical signals onto the joint axis with relative rotation occurring while the signals are on-axis. A rotating member for each channel has a mirror for reflecting the on-axis signal portion off-axis to a receptor fiber. Alignment between the rotating member and the receptor fiber as well as the drive for the rotating member is provided by a pair of magnets of opposite polarity. One of the magnets is secured to the rotating member while the other is secured to the rotor. The magnetic interaction is intended to insure synchronous rotation of the rotor and the rotating member.

Another rotary joint is illustrated in U.S. Pat. No. 4,900,117 to Chen. This joint or coupler comprises a rotor and a stator joined together by a set of bearings. The two parts are similarly constructed. Each part has circular tracks of selectively angled reflectors for projecting light beams to corresponding receptors during relative rotation with the other part to achieve optical links.

Still another type of rotary joint is exemplified by U.S. Pat. No. 4,934,783 to Jacobson. The Jacobson rotary joint includes a rotating input lens assembly which emits a ray set from a focal point to illuminate a cylindrical reflector. Rays reflected from the cylindrical reflector pass through another focal point and are reflected from the cylindrical reflector to pass through still another focal point. This reflection and focusing continues until the ray paths are incident to a window in the cylindrical reflector and exit. Exiting rays are focused by a lens arrangement which focuses the rays to an output optical fiber Yet another type of rotary joint, which is a predecessor to the present invention, is exemplified by U.S. Pat. No. 4,109,998 to Iverson. The Iverson rotary joint utilizes a derotating optical element such as a dove prism to derotate the images of an input set of optical transmitters located on the rotor, so that they may be focused onto stationary photo detectors located on the stator. Derotation is accomplished by gearing the rotor and prism in such a way that the prism rotates half as fast as the rotor. The Iverson optical rotary joint does not utilize optical fiber, but rather light emitting diodes or lasers and detectors. As a result, it does not require the high alignment accuracy required for single-mode optical fibers, because the detectors may be quite large. In consequence, the device is not bidirectional and cannot be used as a passive fiber optic device. Because of the relatively large size of the detectors, they will be limited in bandwidth to well below the bandwidth capability of the optical fiber. Several design features preclude its adaptation to single-mode fiber. The lenses which focus light from input to output are large lenses located on the prism rotor on either side of the prism. While acceptable for the relatively crude alignment of LEDs and detectors as in the Iverson patent, this would be limited for a single-mode fiber device by the requirement to maintain ultra-tight lateral and angular tolerances between rotor, prism rotor, and stator. Additionally, some channels are necessarily off the lens axis, leading to unacceptable aberrations in coupling a plurality of single-mode fibers. In general, because it was not required, the Iverson patent does not even discuss the associated mechanical means of meeting and maintaining the critical alignment tolerances imposed by single-mode fiber.

Some multiple channel rotary joints for multi-mode fibers exhibit high optical loss and variation of loss with rotation. Additionally, the extreme tolerances associated with single-mode fibers preclude the easy adaptation of these devices to handle single-mode fibers. The tight tolerances result in single-mode devices with excessive loss or excessive variation of loss with rotation. Rotary joints for single-mode fibers have been developed but are limited to a single on-axis fiber. Devices which actively align the output fibers to track the input fibers have been discussed but these are more complicated, require electrical power, and do not allow operation in both directions.

Accordingly, it is an object of the present invention to provide a multi-channel fiber optic rotary joint device which avoids the aforementioned problems in a bidirectional manner. In contrast to the U.S. Pat. No. 4,109,998 to Iverson (discussed above), the present invention is a passive optical device which is not limited in bandwidth except as the optical fiber is so limited.

It is a further object of the present invention to provide a fiber optic rotary joint device which allows large numbers of fibers to be passed.

It is yet another object of the present invention to provide a fiber optic rotary joint device which allows multiple fiber performance with single-mode fibers.

It is still another object of the present invention to provide a fiber optic rotary joint device having an improved bearing system for permitting improved alignment of the rotor.

It is still another object of the present invention to provide a fiber optic rotary joint device which can be easily aligned with superior accuracy.

Still other objects and advantages of the present invention will become more apparent from the following description and drawings in which like reference numerals depict like elements.

SUMMARY OF THE INVENTION

A fiber optic rotary joint device in accordance with the principles of the present invention includes a rotor connected to at least one of an input optical fiber array and an output optical fiber array and a stator connected to the other of the input/output optical fiber array. The rotor defines a rotor cavity in which a prism is positioned for derotating an image of the input array to allow coupling to the output array and a prism rotor.

A first bearing system is provided in the device for maintaining angular alignment of the rotor and stator during rotation. This bearing system includes a first ball bearing means between the stator and the rotor and a first thrust bearing means for holding the rotor in alignment against the race of the first ball bearing means.

A second bearing system is provided in the device for maintaining the prism rotor in angular and lateral alignment with the rotor and the stator. The second bearing system includes second ball bearing means between the prism rotor and the stator and second thrust bearing means for seating the prism rotor against the second ball bearing means.

The rotary joint device further includes gear means between the rotor and the prism rotor for rotating the prism at half of the speed of the rotor. In a preferred embodiment, the gear means includes a ring gear mounted to the rotor, a star gear mounted to the prism rotor and a drive gear arrangement connecting the ring and star gears.

Other details of the rotary joint device of the present invention are set out in the following description.

DETAILED DESCRIPTION OF THE INVENTION

Figure 1:
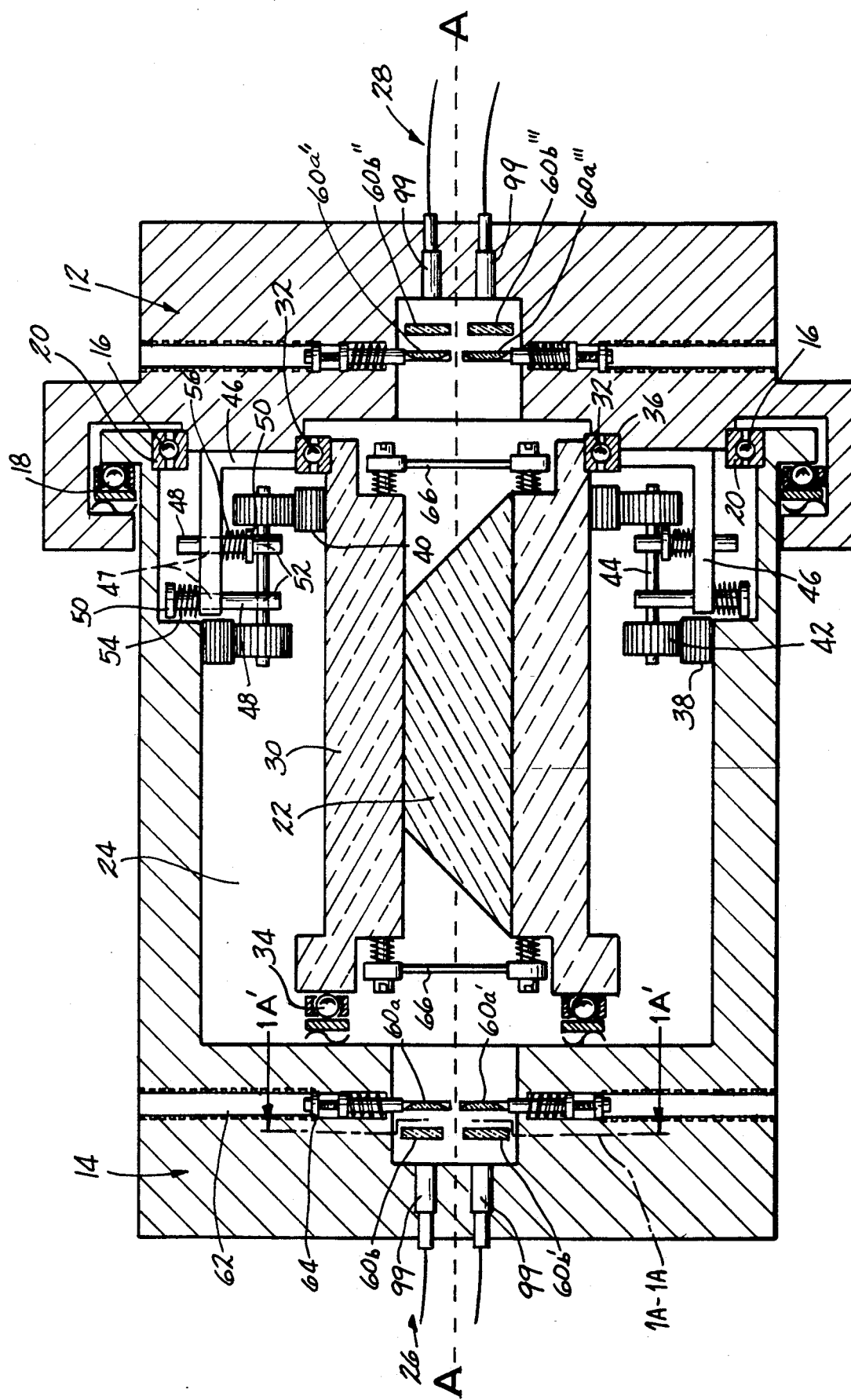
FIG. 1 is a cross sectional view of the fiber optic rotary joint device of the present invention, which is diagrammatic in a minor respect, namely the showing of certain cylindrical lenses.

Referring now to FIG. 1, the rotary optical fiber joint of the present invention includes a stator 12 and a rotor 14 driven by a drive mechanism (not shown). The stator and the rotor may be formed from any suitable material known in the art.

Precise angular and lateral alignment of the rotor 14 and the stator 12 must be maintained during rotation. In the present invention, this is accomplished by directly coupling the stator to the rotor by precision radial ball bearings 16. This direct coupling approach is superior to other rotary joint coupler designs in which the rotor is coupled to the prism rotor and thence to the stator. As a result, many possible angular and lateral error sources are eliminated. Spring preloaded thrust bearing assemblies 18 are provided to hold the rotor 14 in alignment against the bearing race 20 of the bearings 16. Spring preloaded thrust bearing assemblies are well known, being made up by combining a conventional roller bearing element with an overlap type wave spring, such as one commercially available from the Smalley Steel Ring Company of Wheeling, Ill.

A rotary prism 22 formed from a light transmitting optical material is mounted within a cavity 24 formed by the rotor 14. The prism 22 is used to derotate the image of the input optical fiber array 26 to allow coupling to the output optical fiber array 28. The prism 22 is supported by a prism rotor 30 which enables the prism 22 to be rotated at half the speed of the rotor.

In the system of the present invention, it is important that the prism rotor 30 be held in angular and lateral alignment with the rotor 14 and the stator 12. This is accomplished through the use of precision radial ball bearings 32 between the prism rotor and the stator and by the spring preloaded thrust bearing assembly 34 positioned at an opposite end of the rotor 30 from the bearings 32. The spring preloaded thrust bearing assembly 34 seats the prism rotor against the bearing race 36 associated with the bearings 32.

A 2-to-1 gearing system is provided so that the prism 22 rotates at half of the speed of the rotor. The gearing system may comprise any system that results in the desired 2-to-1 gearing. As shown in FIG. 1, the gear system includes a ring gear 38 mounted to the rotor 14 and a star gear 40 mounted to the prism rotor 30. The gears 38 and 40 are connected to each other by drive gears 42 mounted on an axle 44.

The bearings and the gears both connect the prism rotor, the rotor and the stator. It is possible for the rotary joint of the present invention to be overconstrained. Errors in the gear train could cause the rotor or prism rotor to be deflected from their proper angular alignment in the bearing. To reduce this possibility, the drive gears 42 are soft or spring mounted so that they will give, without losing rotary alignment, before the angular alignment in the bearings is degraded. As shown in FIG. 1, an L-shaped bracket 46 is mounted to the stator 12. The bracket has two apertures 47 in which arms 48 are slidingly mounted. Each arm includes a stop member 50 and a slot 52 through which the axle 44 passes. Spring members 54 and 56 are mounted one on each respective arm 48 between the L-shaped bracket 46 and the respective stop member 50. As can be seen from the figure, one spring member 54 is positioned on one side of the bracket 46 while the other spring member 56 is positioned on the opposite side of the bracket.

This spring arrangement allows the drive gears 42 to be held tightly against the respective gears 38 and 40 by spring force, while the axle 44 is free to move against the spring members 54 and 56 before any force can deflect the rotor or prism rotor from its seated position against the respective bearing races 20 and 36. In a preferred construction, at least three such drive gear arrangements are placed symmetrically around the ring gear 38 and the star gear 40 to balance the spring deflection forces being applied to the rotor and the prism rotor. If desired, either the drive gears 42 or the ring and star gears 38 and 40 can be antibacklash gears to reduce backlash misalignment.

The input and output optical fiber arrays may each consist of one or more optical fibers. The beam of light emerging from or entering each fiber is coupled to the optical fiber by a miniature collimation lens 99, preferably of the gradient index rod type. The miniature lenses 99 enlarge or expand a light beam coming from each fiber to improve the coupling between the input and output fibers. The use of an expanded beam coupling eases all lateral tolerances that impact the alignment of the lenses and prism with respect to the device axis of rotation. Expanded beam coupling also tightens all angular tolerances that impact the alignment of the lenses.

Figure 1A:
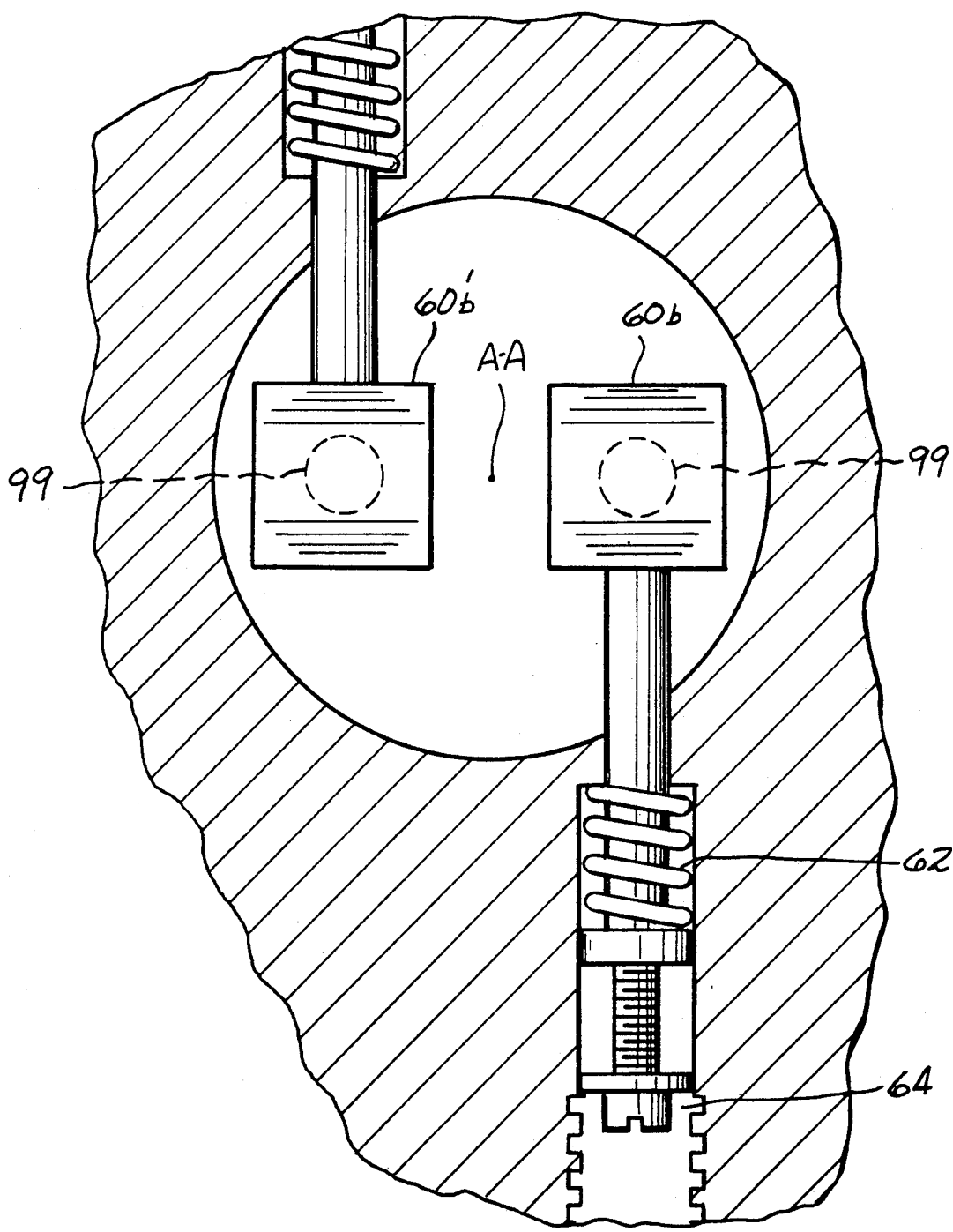
FIG. 1A is a cross sectional view taken along section line 1A—1A, FIG. 1, as viewed in the direction of arrows 1A', 1A', which is diagrammatic in a minor respect, namely the showing of certain cylindrical lenses.

There is disposed in the optical signal propagation path between each miniature collimation lens 99 and the confronting slanted face of the rotary prism 22 an axially spaced pair of cylindrical lenses. As shown in FIG. 1, pairs of cylindrical lenses 60a and 60b, 60a' and 60b', 60a" and 60b" and 60a''' and 60b''' are disposed between respective different ones of the four collimation lenses 99 shown in the figure and the corresponding confronting slanted face. The cylindrical lenses whose reference characters include a suffix letter "b" are the axially outwardlymost disposed lens of each spaced pair, and the cylindrical lenses whose reference characters have a suffix letter "a" are the axially inwardlymost disposed lens of each pair. For purposes of the following description refer to FIGS. 1 and 1A conjunctly with one another. Each of cylindrical lens 60a, 60b, 60a' and 60b' has an axially outwardlymost lens face which is planar and has an axially inwardlymost face which is a cylindrical surface. In FIG. 1, the axially inwardlymost cylindrically surfaced face of lenses 60a and 60a' are diagrammatically indicated by representing the lens as having chordal cross section in the plane of the drawing. In FIG. 1A, the axially inwardlymost cylindrically surface faces of lenses 60b and 60b' are indicated by the appropriate shading for viewing cylindrical surfaces head on. In conjunctly viewing FIGS. 1 and 1A it will be recognized that FIG. 1A is a section along dashed line 1A—1A viewed from the direction of arrows 1A', 1A'. It will be appreciated that the cylindrical surfaced lens face of axially inwardlymost lenses 60a and 60a', and the cylindrical surfaced lens faces of axially outwardlymost lenses 60b and 60b' are in a mutually orthogonal relationship. Therefore axially inwardlymost lens 60a and 60a', and axially outwardlymost lenses 60b and 60b', respectively cause light propagating therethrough to be deflected in mutually orthogonal directions of deflection. Each set of inner and outer cylindrical lenses is suitably mounted to enable lateral movement (relative to prism axis A—A) in the direction that moves their respective chordal cross sections (shown only for inner cylindrical lenses 60a, 60a', 60a", 60a''') with movement perpendicular to prism axis A—A. (It will be appreciated that the chordal cross sections of the cylindrical lenses are shown only in FIG. 1, and only with respect to the axially inwardlymost disposed lens of each pair, namely lenses 60a and 60a' mounted to the rotor 14, and lenses 60a" and 60a''' mounted the stator 12. The cylindrical nature of the axially inwardly most faces of lenses 60b and 60b' are shown by shading in FIG. 1A). Since the lens faces forming the cylindrical surfaces of inner and outer lens are respectively in an orthogonal relation, the directions of their respective adjustable motion are in mutual orthogonal relationship also.

Stated another way, the light exiting each of the miniature lenses 99 is passed through two axially spaced cylindrical lens arrangements 60b (axially outwardlymost arrangement) and 60a (axially inwardlymost arrangement) with these two arrangements mutually orthogonally placed with respect to the longitudinal axis A—A (FIG. 1) of the prism 22. The lens arrangements 60b, 60a are each mounted to allow lateral adjustment. Any suitable means known in the art such as a track 62 and locking arrangement 64 may be used to adjust each cylindrical lens. Lateral motion of a cylindrical lens in a direction substantially perpendicular to the axis A—A produces an angular deflection of the light beam. With one lens in each arrangement causing deflections in one direction and the second lens in each arrangement causing deflections in the orthogonal direction, universal adjustment of deflection is provided. If the lenses have long focal lengths, a relatively crude lens motion gives a very small angular adjustment. It will be apparent that what is provided for each separate channel is an adjustable lens means for adjusting the deflection angle of the propagation path, at each of the rotor and stator ends of the device. Note that for each individual fiber optic channel through the device, one axially spaced pair of an axially inwardlymost disposed lens (e.g., 60a) and an axially outwardlymost lenses (e.g., 60b) is mounted to rotor 14, and another such pair (e.g. 60a" and 60b") is mounted to stator 12.

It is further preferred that the prism rotor 30 include two supplemental "fine tune" lateral adjustors 66. The adjustors consist of thin plane parallel glass plates mounted to enable them to be adjusted in angle in two orthogonal directions. The plate adjustment means may comprise any suitable means known in the art such as an adjustment screw engaging an end portion of the prism rotor 30. An angular adjustment of the thin plate assembly produces a fine lateral beam displacement.

Prior to use of the fiber optic rotary joint device of the present invention, two alignment steps must be performed. The first involves alignment of the prism 22 so that its rotation axis is parallel and coincident with the rotation axis of the bearing 32. An apparatus for performing the first alignment step is shown in FIG. 2.

Figure 2:
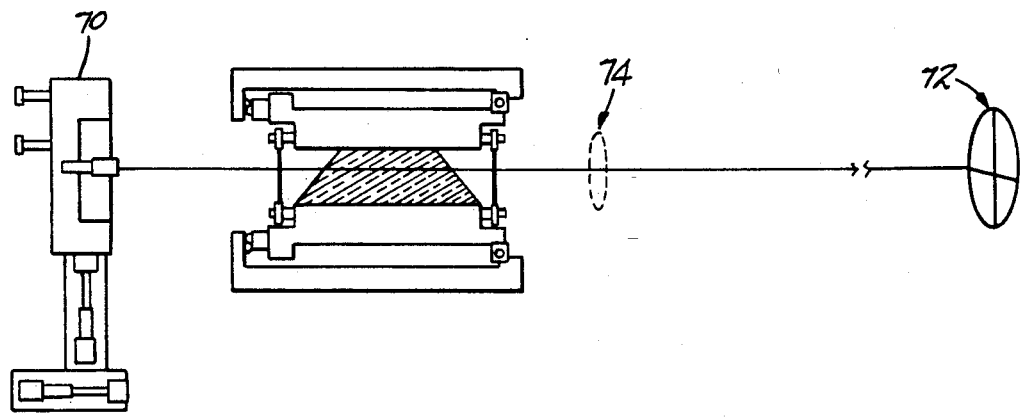
FIG. 2 is a schematic representation of a system for aligning the device of the present invention.

As shown in FIG. 2, the alignment apparatus includes a stage 70 which is capable of angular and lateral movement. A fiber and miniature lens system 71 for producing a collimated beam of light is mounted to the stage. Any suitable light source (not shown) such as a laser can be connected to the fiber and lens system. If desired, the fiber and lens system may be replaced by a laser mounted on the stage. When such a laser is used, the laser head must be capable of producing a collimated beam of light. It is desirable that any laser which is used have the same wavelength as the rotary joint device is being designed to work with because the rotary axis of the prism varies with wavelength.

At the initiation of the alignment process, the prism rotor 30 is mounted firmly in its bearing 32 seated against the bearing race 36. The light beam from the fiber and lens system 71 passes through the prism to a detector 72 having a screen where its position may be viewed. At this point, as the prism rotor 30 is rotated, the beam will describe a complex trajectory on the detector screen due to the presence of four errors. The input beam not being parallel to the prism axis causes a displacement at the screen which forms a circle which rotates twice as fast as the prism rotates. The input beam being laterally displaced likewise causes a circle at twice the rotation rate. The prism being laterally displaced or tilted from the rotation axis causes a circle, which rotates at the rate the prism is rotated.

The first correction step involves the insertion of a long focal length lens 74 with the detector screen being at its focal point. This eliminates the effect of all lateral errors so that any circle seen on the screen represents angular error of the input beam only. The stage 70 is then adjusted in angle to eliminate this error. Thereafter the lens 74 is removed. The pattern on the screen is studied and if movement at twice the prism rotation rate dominates, the stage 70 is adjusted laterally to minimize the effect until movement at the prism rate dominates. The lateral adjustors 66 are tilted to align the prism's rotation axis with the bearing rotation axis and minimize the circle on the screen. At some point, beam lateral error effect may again become dominant at which time those are again adjusted. This alignment process is continued until minimal beam motion at the target is seen. The detector and its screen 72 may then be replaced with a miniature lens and optical fiber and further fine adjustments made by noting variations in optical throughput with prism rotation.

The second alignment step is performed after the rotary joint device is fully assembled. The parts are temporarily locked in rotary alignment. Each channel is then aligned by adjusting the cylindrical lenses 60a, 60a'... 60b, 60b'... until maximum throughput is achieved. This adjustment compensates for all angular, lateral, and rotary errors in the alignment of the fibers. Upon the completion of alignment, the adjustors may be fixed in place with an epoxy type material. The fine tune adjustors 66 are similarly adjusted.

Figures 3A, 3B, 3C:
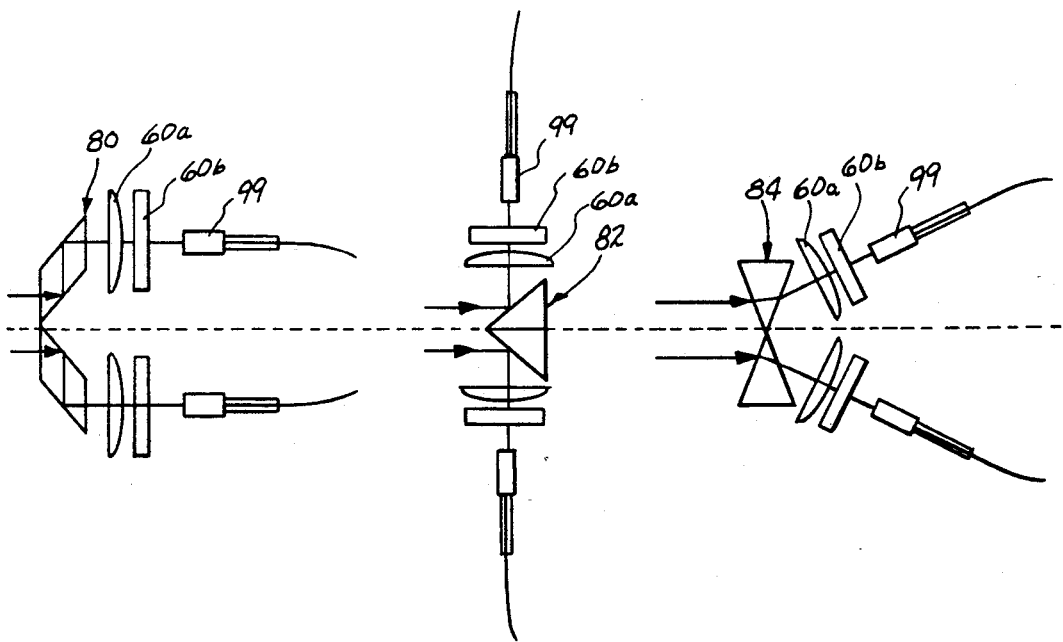
FIGS. 3A through 3C illustrate schematic representations of three methods for minimizing the prism aperture to shorten the separation of the optical fibers.

It is desirable to minimize the prism aperture to shorten the separation of the optical fibers. It is necessary however that the beams be far enough apart to permit the location and translation of the separate cylindrical lenses. FIG. 3 shows three methods to accomplish this separation. In FIG. 3A, periscope type prisms 80 displace the beams away from the rotation axis. In FIG. 3B, mirrors 82 are used to deflect the beams at right angles and the remaining optics are mounted perpendicular to the rotation axis. In FIG. 3C, prisms 84 deflect the beams at an angle to the rotation axis. Combinations of the above methods may also be used.

Optimum positioning of the fiber relative to the focus of the miniature gradient index (GRIN) lenses is accomplished by precision polishing of oversized lenses to the correct length and physically fixing the fiber in contact with the lens surface by optical epoxy. The correct lens length is established by polishing pairs of lenses to different lengths and testing fiber to fiber throughput with the lenses when separated by a distance and cylindrical lenses matching that used in the final device.

The present invention offers numerous advantages. For example, large numbers of fibers may be passed through the rotary joint device of the present invention. The number of fibers is limited only by the device size required and the ability to incorporate the needed number of cylindrical lens adjustors. Previous multi-fiber designs were limited by the accuracy of the fiber to miniature lens alignment which limited the separation allowed between lenses and hence the prism aperture.

The device of the present invention allows multiple fiber performance with single-mode fibers. Previous designs with multi-mode fibers proved to have excessive loss and loss variation with rotation when used with single-mode fibers.

The bearing system of the present invention is superior to other designs which align the rotor to the prism rotor and thence to the stator. Direct bearing alignment of the rotor to the stator minimizes the number of sources of angular and lateral errors between these two pieces.

The steps needed to align the device of the present invention, as can be seen from the foregoing discussion, can be easily performed with simple laboratory equipment. The alignment accuracy results which are obtained are superior to those obtained with previous methods. The alignment accuracy which is achieved results directly in reduced loss and loss variation. The alignment concept eliminates most of the extremely tight machining tolerances otherwise required in single-mode alignment devices.

Still further, the accuracy of the proposed bearing arrangement and the accuracy of alignment together permit lower losses and lower variation in loss with rotation than other designs. The device of the present invention also lends itself to various fiber sizes and fiber types. These may include multimode step index fibers, multi-mode graded index fibers, singlemode fibers, and polarization preserving fibers.

It should also be noted that the rotary joint device of the present invention operates with continuous rotation in either direction. Additionally, light may be transmitted through the device in either direction. Some devices actively align one side to track light transmitted from fibers on the other side.

If desired, the rotary joint device may incorporate miniature aspheric lenses and prism types with angled faces to permit operation with low reflection of light back into the transmitting fibers. The miniature aspheric lenses when used are corrected for spherical aberration and reduce the loss associated with the separation between opposing lenses. These lenses permit increased array sizes by allowing greater prism apertures. Their curved surfaces minimize reflections back to the fiber.

If desired, polarization preserving fibers may be used with the rotary joint device. When such fibers are used, the device of the present invention preserves the state of polarization across the rotating interface.

Several different types of rotation prisms may be used in the device of the present invention with differences in their required size, loss, dispersion effects, back-reflection, and total optical path length. For example, a Pechaun prism may be used. This type of prism has a compact size and no dispersion, but has high loss and glass/air interfaces perpendicular to the light path which could cause excessive reflection back into the input fibers. Alternatively, a Dove prism may be used. The Dove prism is longer but has a short optical path length which minimizes device loss. The prism has low loss and glass/air interfaces are angled, reducing back-reflection.

Although there has been shown and described hereinabove a specific arrangement of a multi-channel fiber optic rotary joint device in accordance with the invention for the purpose of illustrating the manner in which the invention may be used to advantage, it will be appreciated that the invention is not limited thereto. Accordingly, any and all modifications, variations or equivalent arrangements Which may occur to those skilled in the art should be considered to be within the scope of the invention as defined in the following claims.

What is claimed is:

1. A fiber optic rotary joint device for transmitting a signal from an input optical fiber array to an output optical fiber array, said rotary joint device comprising:
   a first rotor connected to at least one of said input optical fiber array and said output optical fiber array;
   said first rotor defining a rotor cavity;
   a stator connected to the other of said input optical fiber array and said output optical fiber array;

a derotation prism carried by a second, prism holding, rotor rotatably mounted within said rotor cavity for derotating an image of said input optical fiber array to allow coupling to said output optical fiber array;

gear means operatively connected between said first rotor and said second prism rotor for rotating said prism at half of the speed of the first rotor;

first and second adjustable lens means respectively mounted to one and the other of said first rotor and said stator for movement in a direction substantially perpendicular to the longitudinal axis of said prism;

first mechanical alignment means for maintaining angular and lateral alignment of said rotor and said stator during rotation; and said first mechanical alignment means including first ball bearing means between said stator and said rotor and first resilient thrust bearing means for holding said rotor in alignment against said first ball bearing means.

2. A fiber optic rotary joint device for transmitting a signal from an input optical fiber array to an output optical fiber array, said rotary joint device comprising:

a first rotor connected to at least one of said input optical fiber array and said output optical fiber array;

said first rotor defining a rotor cavity;

a stator connected to the other of said input optical fiber array and said output optical fiber array;

a prism carried by a second, prism holding, rotor rotatably mounted and positioned substantially entirely within said rotor cavity for derotating an image of said input optical fiber array to allow coupling to said output optical fiber array;

gear means operatively connected between said first rotor and said second, prism holding, rotor for rotating said prism at half of the speed of the first rotor;

first mechanical alignment means for maintaining angular and lateral alignment of said first rotor and said stator during rotation; and said first mechanical alignment means including first ball bearing means between said stator and said rotor and first resilient thrust bearing means for holding said rotor in alignment against said first ball bearing means.

3. The rotary joint device of claim 2 further comprising:

second mechanical alignment means for maintaining said second, prism holding, rotor in angular and lateral alignment with said first rotor and said stator; and said second mechanical alignment means comprising a second ball bearing means between said second, prism holding, rotor and said stator and second resilient thrust bearing means for seating said second prism rotor against said second ball bearing means.

4. The rotary joint device of claim 3 further comprising said second ball bearing means being located at a first end of said second, prism holding, rotor and said second resilient thrust bearing means being located at a second end of said second prism rotor opposed to said first end.

5. The rotary joint device of claim 2 wherein said gear means comprises:

a ring gear mounted to said first rotor;

a star gear mounted to said second, prism holding, rotor; and at least one drive gear arrangement for connecting said ring gear to said star gear, each said drive gear arrangement including two drive gears mounted on an axle.

6. The rotary joint device of claim 5 wherein said gear means further includes means for spring mounting said drive gears so that said drive gears will give without losing rotary alignment before angular alignment of any bearing means is degraded.

7. The rotary joint device of claim 6 wherein said gear means further comprises at least three of said drive gear arrangements placed symmetrically about said ring gear and said star gear for balancing any spring deflection forces applied to said rotor and said first ball bearing means.

8. The rotary joint device of claim 5 wherein at least one of said ring, star and drive gears is an antibacklash gear for reducing backlash misalignment.

9. A fiber optic rotary joint device for transmitting a signal from an input optical fiber array to an output optical fiber array, said rotary joint device comprising:

a first rotor connected to at least one of said input optical fiber array and said output optical fiber array;

said first rotor defining a rotor cavity;

a stator connected to the other of said input optical fiber array and said output optical fiber array;

a derotation prism carried by a second, prism holding, rotor rotatably mounted within said rotor cavity for derotating an image of said input optical fiber array to allow coupling to said output optical fiber array, said derotation prism having a stator end and a rotor end;

gear means operatively connected between said first rotor and said second, prism holding, rotor for rotating said prism at half of the speed of the first rotor; and first and second adjustable lens means respectively mounted to one and the other of said first rotor and said stator for movement in a direction substantially perpendicular to the longitudinal axis of said prism.

10. The rotary joint device of claim 9 wherein said first adjustable lens means comprises a first pair of laterally adjustable cylindrical lenses mounted to said first rotor, the individual cylindrical lenses of the first pair being mutually orthogonally placed relative to the optical axis of the derotation prism, and said second adjustable lens means comprises a second pair of laterally adjustable cylindrical lenses mounted to said stator, the individual cylindrical lenses of the second pair being mutually orthogonally placed relative to the optical axis of the derotation prism.

11. The rotary joint device of claim 10 wherein one lens in each pair causes deflection of a light beam in a first reference plane passing through the optical axis of the derotation prism and a second lens in each pair causes deflection of a light beam in a second reference plane passing through the optical axis of the derotation prism which is orthogonal to said first reference plane.

12. The rotary joint device of claim 9; and first and second supplemental lateral beam adjustor means respectively provided at one and the other ends of said prism to provide fine lateral beam displacement.

13. The rotary joint device of claim 12 wherein each of said supplemental lateral adjustor means consists of a thin plane generally transversely disposed glass plate mounted to said rotor such that it can be adjusted in angle in two orthogonal directions.

* * * * *